United States Patent
Elnozahy

(10) Patent No.: US 8,397,032 B2
(45) Date of Patent: Mar. 12, 2013

(54) RECOVERY IN SHARED MEMORY ENVIRONMENT

(75) Inventor: Elmootazbellah Nabil Elnozahy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/413,758

(22) Filed: Mar. 7, 2012

(65) Prior Publication Data

US 2012/0226870 A1 Sep. 6, 2012

Related U.S. Application Data

(63) Continuation of application No. 12/788,944, filed on May 27, 2010, now Pat. No. 8,312,224.

(51) Int. Cl.
*G06F 12/00* (2006.01)
(52) U.S. Cl. .......................................................... 711/141
(58) Field of Classification Search .................. None
See application file for complete search history.

(56) References Cited

U.S. PATENT DOCUMENTS

| | | | |
|---|---|---|---|
| 6,148,416 A | 11/2000 | Masubuchi | |
| 6,779,087 B2 | 8/2004 | Saulsbury et al. | |
| 7,085,955 B2 | 8/2006 | Prabhu | |
| 2007/0195103 A1* | 8/2007 | Koufaty | 345/559 |
| 2008/0235456 A1 | 9/2008 | Kornegay et al. | |
| 2009/0063898 A1 | 3/2009 | Eisen et al. | |
| 2011/0138160 A1* | 6/2011 | Sato et al. | 713/2 |

OTHER PUBLICATIONS

Mardriles et al; Boosting Single-thread Performance in Multi-core Systems through Fine-Grain Multi-Threading, ISCA'09, Jun. 20-24, 2009, Austin, Texas, USA.

* cited by examiner

*Primary Examiner* — Brian Peugh
(74) *Attorney, Agent, or Firm* — Garg Law Firm, PLLC; Rakesh Garg; Eustus Dwayne Nelson

(57) ABSTRACT

A method for recovery in a shared memory environment is provided in the illustrative embodiments. A core in a multi-core processor is designated as a user level core (ULC), which executes an instruction to modify a memory while executing an application. A second core is designated as a operating system core (OSC), which manages checkpointing of several segments of the shared memory. A set of flags is accessible to a memory controller to manage a shared memory. A flag in the set of flags corresponds to one segment in the segments of the shared memory. A message or instruction for modification of a segment is received. A cache line tracking determination is made whether a cache line used for the modification has already been used for a similar modification. If not, a part of the segment is checkpointed. The modification proceeds after checkpointing.

11 Claims, 8 Drawing Sheets

FIG. 1
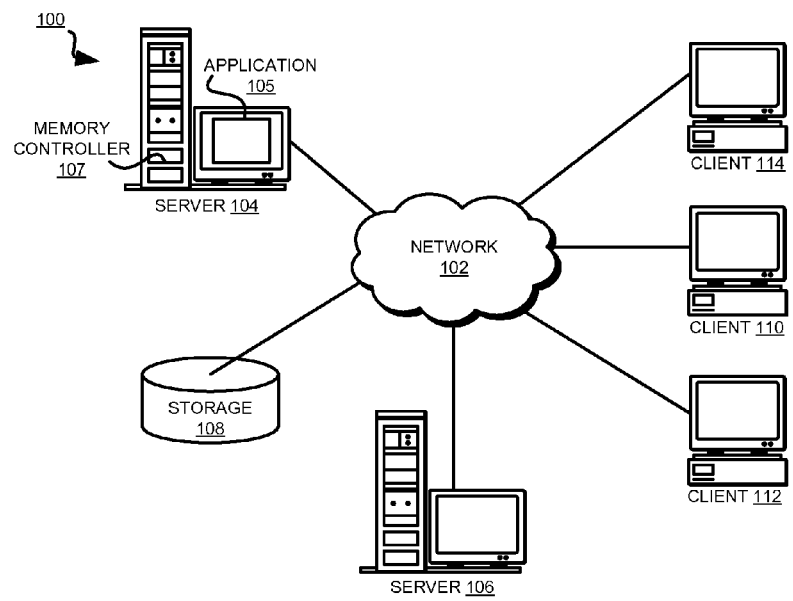
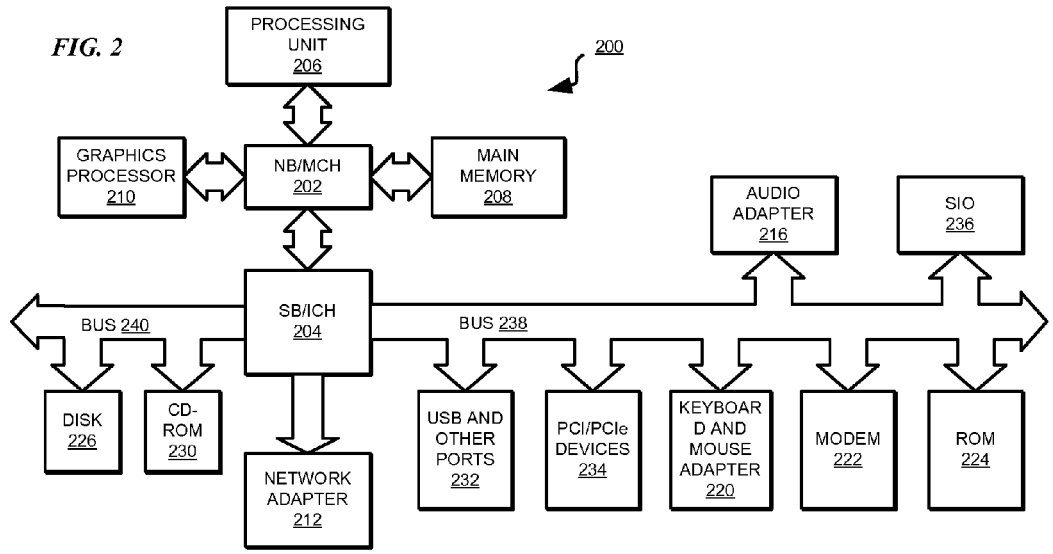
FIG. 2

RECOVERY IN SHARED MEMORY ENVIRONMENT

BACKGROUND OF THE INVENTION

1. Field of the Invention

The present invention relates generally to an improved data processing system, and in particular, to a computer implemented method for improving failure tolerance in data processing systems. Still more particularly, the present invention relates to a computer implemented method for recovery in a shared memory environment.

2. Description of the Related Art

When a failure occurs in a data processing system, it is desirable to reinitiate the data processing system from a known time of operation in the past. As a part of reinitiating the data processing system, data, processes, application status, and other information is restored to the known time in the past and the system operation recovered from that point in time. The known time is called a checkpoint. In other words, a checkpoint is a view of the data, processes, application statuses, and information in a data processing system at some time in the past.

In order to be able to accomplish a recovery operation from a checkpoint, the data, states, and other information existing in the data processing system at the checkpoint are saved from a memory to a highly available data storage system that can withstand failures, herein called stable storage. Such data, states, and other information at a checkpoint are collectively called checkpoint data.

Typically, checkpoint data is collected and saved at a number of checkpoints as a data processing system continues to operate. In case of a data processing system failure, a user or the system restores the data processing system operation from the most recently saved checkpoint by repopulating the data processing system with the checkpoint data.

A user or the system may determine how often the checkpoints occur during a data processing system's operation. When a new checkpoint is successfully saved, previous checkpoints may be purged to reduce the space needed on stable storage.

An inverse relationship exists between the frequency of taking the checkpoints and the amount of rework a data processing system has to perform to compute again up to the point the failure occurred. The less frequently the checkpoints are taken, the higher the likelihood that the checkpoint is farther back in the past from the point of failure, and the more rework the data processing system has to perform to re-compute up to the time the failure occurred. The more frequently the checkpoints are taken, the higher the likelihood that the checkpoint is closer to the time of failure, and the lesser the work and the resources have to be expended to restore operation and recover the data processing system to the time of failure.

SUMMARY OF THE INVENTION

The illustrative embodiments provide a method for recovery in a shared memory environment. An embodiment designates a first core in a multi-core processor configuration as a user level core (ULC), where the ULC executes an instruction to modify a memory during the course of executing an instruction of an application. The embodiment designates a second core in the multi-core processor configuration as an operating system core (OSC), where the OSC manages checkpointing of several segments of the shared memory. At the beginning of a checkpoint, the OSC stops the threads running on the ULC, records their contexts, and flushes the caches. The state in main memory thus corresponds to the checkpoint to be saved. The embodiment sets a bitmap in the memory controller such that each bit corresponds to a segment of main memory that will be checkpointed to stable storage. The bit denotes the corresponding segment as being checkpointed.

The OSC then resumes the threads running on the ULC, and the checkpointing proceeds in parallel with the threads running on ULC, which advance beyond the checkpoint even if the checkpoint itself is not complete on stable storage.

As the checkpointing proceeds in the background, the OSC schedules the memory to be written to stable storage. Whenever a memory segment is completely written to stable storage, the OSC resets the corresponding bit in the memory controller to indicate that the checkpointing for the segment is complete.

If a user thread on the ULC or on a remote processor attempts to modify a data item, such modification will be made in the caches. The checkpoint data in main memory is thus made intact until they are written to stable storage. Furthermore, the threads on the ULC are not disturbed or are required to stop during the checkpointing, which improves performance.

If a modified cache line is to be evicted from the cache and written back into its home location, then care is taken to ensure that the checkpoint data is not corrupted by the modification. To do so, the memory controller checks the corresponding bit map of the segment containing the cache line. If the bit is not set, this case corresponds to the segment already having completed its checkpoint and the modification is allowed in the home location in memory. If the bit is set, this case corresponds to a memory segment whose checkpointing is still underway. The memory controller sends a message to the OSC. In this case, the OSC detects if the cache line has been modified in a previous instruction that was issued subsequent to the checkpoint. In this case, the old copy of the cache in main memory is not part of the checkpoint and the writing to main memory proceeds. Otherwise, the old copy of the cache in main memory is part of the checkpoint, in which case the OSC records the old copy of the cache line and schedules it for writing into the checkpoint. Then, the modification is allowed to proceed to main memory while the OSC takes note that the corresponding cache line within the segment has been checkpointed. Further writes to this cache lines into main memory will proceed.

The checkpoint is complete when all the memory has been saved to stable storage.

In another embodiment, the instruction to modify data is received at the ULC. The determining whether the modification according to the instruction can occur in the cache is performed using a cache associated with the ULC.

Another embodiment checks the flag corresponding to the segment when the modification according to the instruction cannot occur in the cache. The embodiment, responsive to the flag being set, sends an interrupt from the memory controller to the OSC causing the cache line tracking. The embodiment checkpoints an older version of the cache line in the segment. If the cache line tracking indicates that the cache line has been written before, a message is sent to the memory controller to proceed with the modification. If the cache line tracking indicates that the cache line has not been written before, the embodiment modifies the segment with the cache line responsive to completing the checkpointing the older version.

In another embodiment, the checkpointing of the segment occurs asynchronously with respect to execution of instructions on the ULC.

In another embodiment, the message is an interrupt.

In another embodiment, the message is sent from the ULC to the memory controller, the instruction to checkpoint the segment is sent from the OSC to the memory controller, and the instruction to proceed is sent from the OSC to the memory controller.

In another embodiment, the set of flags is a bitmap, and a flag in the set of flags is a bit in the bitmap.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a network of data processing systems in which the illustrative embodiments may be implemented;

FIG. 2 depicts a block diagram of a data processing system in which the illustrative embodiments may be implemented;

DETAILED DESCRIPTION OF THE PREFERRED EMBODIMENT

Figure 3:
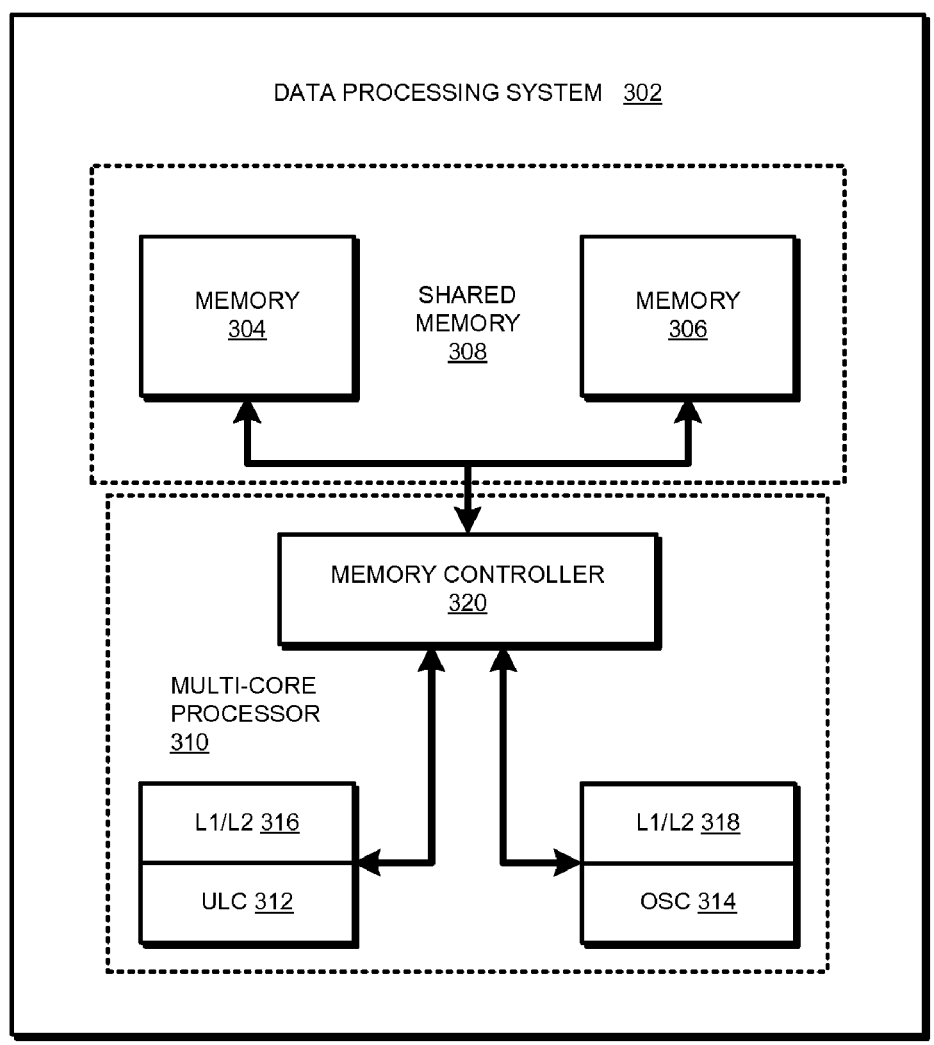
FIG. 3 depicts a block diagram of an example shared memory configuration with respect to which an illustrative embodiment may be implemented.

Presently, in order to take a checkpoint, to with, save checkpoint data, currently executing operations in a data processing system have to be stopped. Then, the data in the memory is saved as checkpoint data. Upon successful checkpointing, the stopped operations are allowed to continue.

The invention recognizes that such present checkpointing techniques are time consuming and degrade the performance of the data processing system. Furthermore, such techniques are not scalable to larger data processing systems, multiprocessor environments, or large shared memory configurations.

Another technique presently used is a copy-on-write checkpointing. According to this technique, a lock, typically a lock bit, is available for each page of memory that is to be checkpointed. When a page has been dumped to stable storage during checkpointing, the lock is reset and processes can write to that page. If a lock of a page is set, that page is in the process of being dumped to stable storage for checkpointing.

The invention recognizes, however, that even with this technique, a process attempting to write to that page is stopped by the data processing system hardware until the operating system completes dumping or copying the page. Until the operating system resets the lock for that page upon successful copying of the page for checkpointing, the process cannot progress.

The illustrative embodiments used to describe the invention generally address and solve the above-described problems and other problems related to checkpointing recovery data in data processing environments. The illustrative embodiments of the invention provide a method for checkpointing recovery data in a shared memory environment. Shared memory environment allows multiple processors or processor cores in the environment to access and utilize a common memory.

The illustrative embodiments are described with respect to data, data structures, and identifiers only as examples. Such descriptions are not intended to be limiting on the invention. For example, an illustrative embodiment described with respect to one type of request may be implemented using a different request in a different configuration, in a similar manner within the scope of the invention.

Furthermore, the illustrative embodiments may be implemented with respect to any type of data processing system. For example, an illustrative embodiment described with respect to a multi-core processor may be implemented in a multiprocessor system within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention. For example, an illustrative embodiment described with respect to single bit or a bitmap may be implemented using another type, size, and arrangement of flag data, in a similar manner within the scope of the invention.

An application implementing an embodiment may take the form of data objects, code objects, encapsulated instructions, application fragments, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, or a combination of hardware and software. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include application 105. Application 105 may cause a request for modifying parts of a shared memory to be generated in server 104. Server 104 includes memory controller 107. Memory controller 107 may operate in accordance with an embodiment of the invention described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts a block diagram of an example shared memory configuration with respect to which an illustrative embodiment may be implemented. Data processing system 302 may be implemented as server 104 in FIG. 1. Memory 304 and 306 may be example memory modules configured in shared memory 308. Each of memory 304 and 306 may be similar to main memory 208 in FIG. 2. Generally, memory 304 and 306 may each be any number or type of data storage device.

Multi-core processor 310 may be an architecture that includes multiple processor cores. A core is a processor or a unit of a processor circuitry that is capable of operating as a processing unit, such as processing unit 206 in FIG. 2. In one embodiment, multi-core processor 310 may be multiple distinct processors, or multi-processors within the scope of the invention.

Within multi-core processor 310, one or more cores may be designated as user level core (ULC) 312 in accordance with an illustrative embodiment. One or more other cores within multi-core processor 310 may be designated as operating system core (OSC) 314 in accordance with an illustrative embodiment. ULC 312 may utilize level 1 and level 2 cache (L1/L2 cache, or simply, cache) 316 for performing the ULC 312's computations. Similarly, OSC 314 may utilize cache 318 for performing the OSC 314's computations.

Memory controller 320 may be a memory controller responsible for managing shared memory 308 and one or more memory modules therein, such as memory 304 and/or memory 306. Memory controller 320 may be accessible to ULC 312 and OSC 314 for performing manipulations on parts of shared memory 308.

Figure 4:
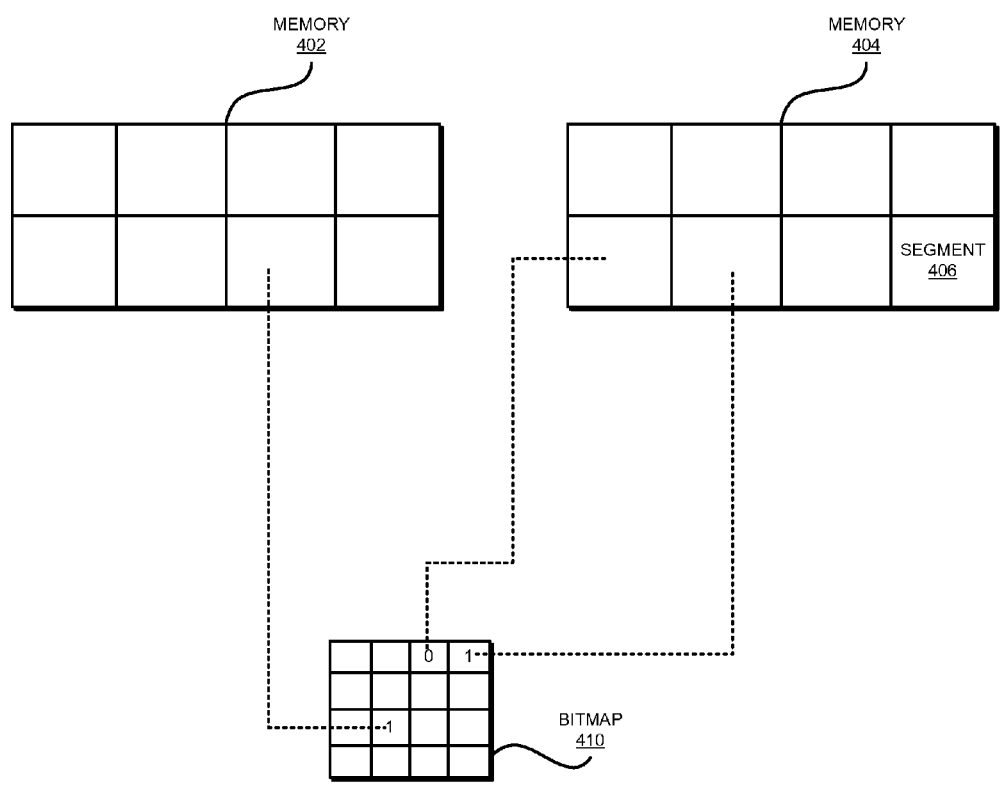
FIG. 4 depicts a block diagram of an example method of managing checkpointing to enable recovery in a shared memory environment in accordance with an illustrative embodiment.

With reference to FIG. 4, this figure depicts a block diagram of an example method of managing checkpointing to enable recovery in a shared memory environment in accordance with an illustrative embodiment. Memory 402 may be similar to memory 304 in FIG. 3 and memory 404 may be similar to memory 306 in FIG. 3. Each memory, such as memory 402 and 404, may be segmented into a set of segments similar to segment 406.

Segment 406 may be a memory block of any suitable size without limitation. For example, segment 406 may be 16 Megabytes (MB) in size and 64 segments may form memory 404. The size of segment 406 will determine how many segments constitute memory 404, and similarly memory 402.

Bitmap 410 may be an example representation in which one bit represents or corresponds to a checkpointing state of one segment in the shared memory. Bitmap 410 and the bits therein are depicted and used only as example representation of the checkpointing state. An implementation may use any data-structure to represent bitmap 410, and any sub-data-structure to represent the bits (or flags) of bitmap 410 within the scope of the invention.

A checkpoint state of a segment is indicative of whether the segment is being checkpointed at a given time. A bit in bitmap 410 corresponding to a segment may be reset (value 0) when the segment is not being checkpointed by copying or dumping. Conversely, the bit is set (value 1) when the corresponding segment is being dumped or copied for checkpointing. An implementation may set and reset the bits in an opposite way within the scope of the invention.

When a segment is being checkpointed, data in the segment cannot be modified until the checkpoint process is completed for the segment. When a segment is not being checkpointed, to with, the segment has already been checkpointed, the segment is available for modification of the data therein.

Some example segments are depicted as currently being checkpointed by setting their corresponding bits in bitmap 410 as value 1. Some other example segments are depicted as having completed their checkpointing by resetting their corresponding bits in bitmap 410 as value 0. Bitmap 410 therefore provides a snapshot of which segments can be modified and which segments are being checkpointed in shared memory at any given time. Furthermore, access to the segments of shared memory for modifying data therein can be regulated using bitmap 410.

Figure 5:
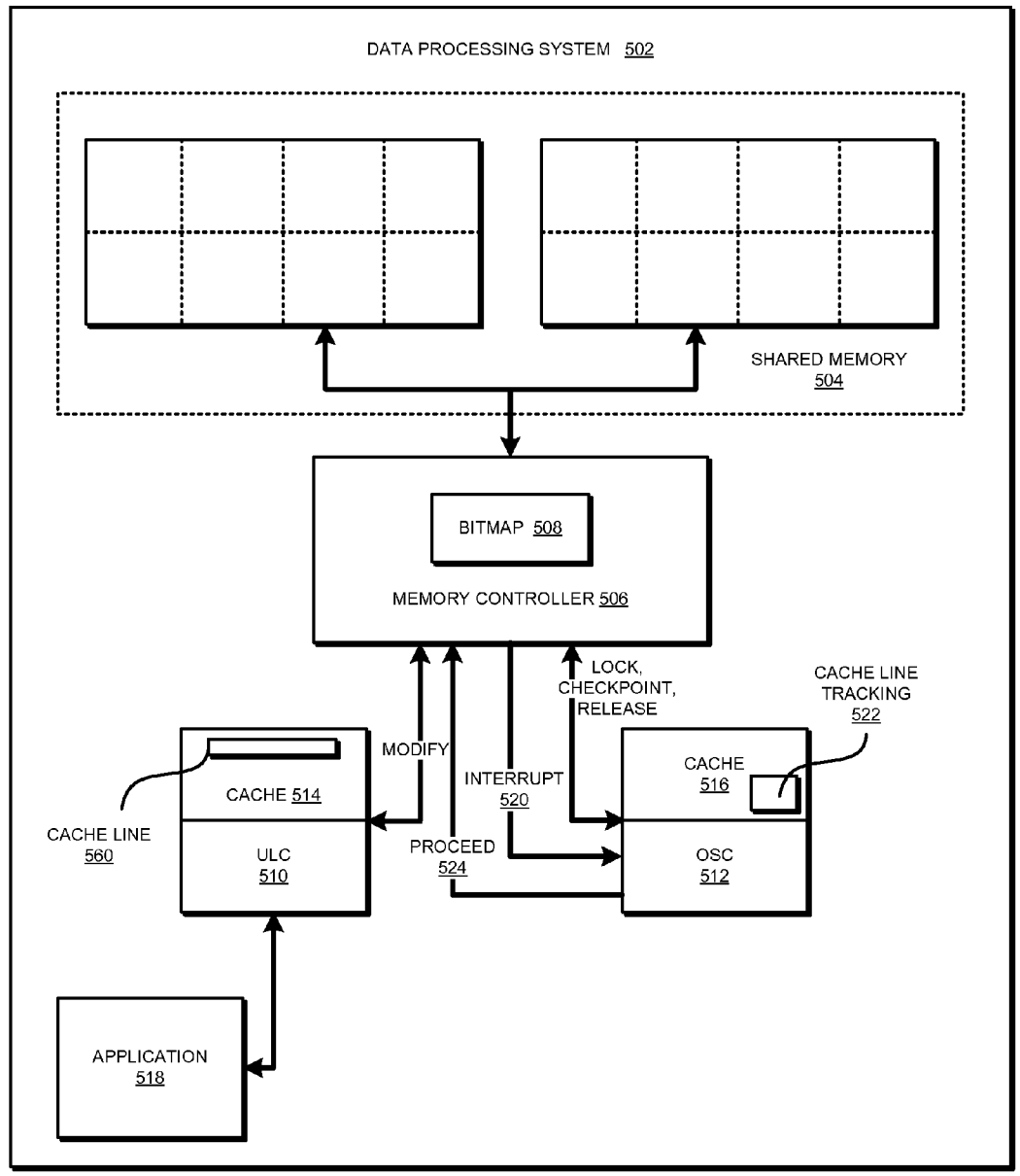
FIG. 5 depicts a block diagram of a method of using shared memory to enable improved checkpointing and recovery in a shared memory data processing environment in accordance with an illustrative embodiment.

With reference to FIG. 5, this figure depicts a block diagram of a method of using shared memory to enable improved checkpointing and recovery in a shared memory data processing environment in accordance with an illustrative embodiment. Data processing system 502 may be similar to data processing system 302 in FIG. 3.

Shared memory 504 may be similar to shared memory 308 in FIG. 3, and may include one or more segmented memory, such as memory 402 and 404 in FIG. 4. Memory controller 506 may be implemented using memory controller 320 in FIG. 3 and modified according to an embodiment. Memory controller 508 may include or have access to bitmap 508. Bitmap 508 may be analogous to bitmap 410 in FIG. 4.

ULC 510 and OSC 512 may be similar to ULC 312 and OSC 314 respectively in FIG. 3. Cache 514 and cache 516 may be implemented using cache 316 and 318 respectively in FIG. 3.

Application 518 may be an application executing using ULC 510. In the course of execution, application 518 may have to modify data. If the data to be modified resides in cache 514 associated with ULC 510, application 518 may proceed to perform the modification without any checkpointing impedance. If the data to be modified does not reside in cache 514 associated with ULC 510, the cache line is brought from its home location in shared memory 504.

When cache line 560 containing data that was modified by application 518 needs to be evicted from the cache 514 and written back to its home location in a segment of shared memory 504, memory controller 506 checks bitmap 508 to examine if the bit associated with the segment containing cache line 560 is set or not. If the bit is not set, then cache line 560 is written to its home location in memory 504. If, on the other hand, bitmap 508 indicates that the segment is being checkpointed, then memory controller 506 sends interrupt 520 to OSC 512.

OSC 512 maintains cache line tracking 522 in cache 516. Cache line tracking 522 provides information whether the cache line 560 from ULC 510 that is to be written in a segment of shared memory 504 has already been written previously.

If OSC 512 determines, using cache line tracking 522, that the interrupt pertains to cache line 560 that has not previously been used to modify a segment in shared memory 504, OSC 512 sends a request to memory controller 506 to read the older cache line 560 from main memory 504. This older copy belongs to the checkpoint and therefore must be saved as part of the checkpoint before the modified copy of cache line 560 can be written to memory 504. After the older copy has been read and retained by the operating system running on OSC 512, then OSC 512 sends a notification to memory controller 520, which then proceeds to allow the modified copy of cache line 560 to be written in memory 504. Also, the operating system running on OSC 512 adjusts cache tracking to denote that cache line 560 has now been copied as part of the checkpoint.

If, on the other hand, cache tracking 522 indicates that cache line 560 has already been copied in the checkpoint file, then OSC 512 proceeds directly to send a notification to memory controller 520 to proceed in writing cache line 560 in main memory. Note that during this operation, application 518 proceeds in parallel with this writing, therefore no overhead due to blocking is likely to occur.

Once a segment has been checkpointed, OSC 512 informs memory controller 520 that it can reset the corresponding bit in bitmap 508. Additionally, OSC 512 purges all cache tracking 522 that belong to all cache lines within the checkpointed segment.

Operating in this manner, ULC 510 can continue to process instructions from application 518 and other applications. OSC 512 manages the checkpointing, and recovery if needed, of the shared memory, thereby improving the overall performance of data processing system 502 without sacrificing performance or reliability. Additionally, the checkpointing is performed asynchronously with respect to the operations of ULC 510.

Figure 6:
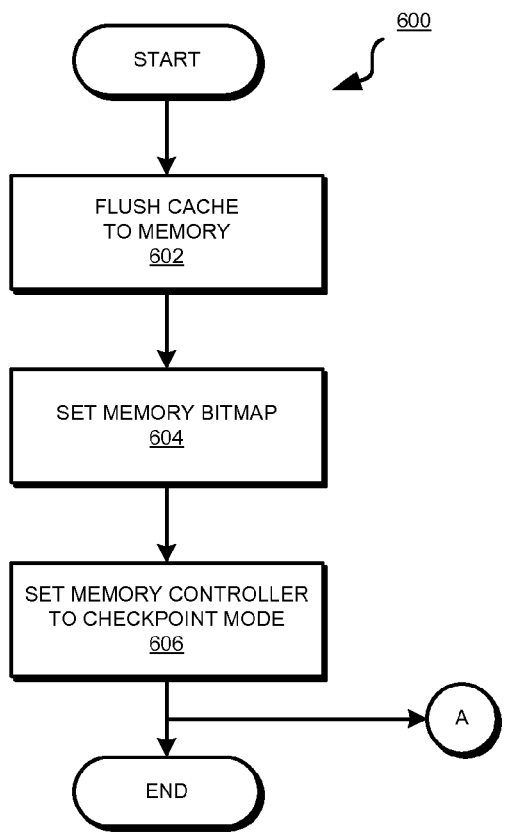
FIG. 6 depicts a flowchart of an example process of initializing checkpointing and recovery in a shared memory environment in accordance with an illustrative embodiment.

With reference to FIG. 6, this figure depicts a flowchart of an example process of initializing checkpointing and recovery in a shared memory environment in accordance with an illustrative embodiment. As an example only, process 600 may be implemented to use OSC 512 in FIG. 5. In one embodiment, an application similar to application 518 in FIG. 5 may implement process 600 without limitation. In another embodiment, parts of process 600 may be implemented using memory controller 506 in FIG. 5 modified according to an embodiment.

Process 600 begins by flushing the cache data to memory and saving the states of all processors such as ULC 512 and OSC 514 in FIG. 5 (step 602). The cache being flushed in step 602 may be a cache associated with any core in a multi-core processor configuration, including but not limited to a cache associated with a ULC.

Process 600 sets the memory bitmap (step 604). For example, step 604 may set all bits in a bitmap if all memory segments are to be written in the checkpoint. Or, in another embodiment, the step 604 may set only those segments that will be written in the checkpoint. For instance, memory segments that have not been modified since the previous checkpoint need not be stored in the new checkpoint and the corresponding bits need not be set. This can be achieved, for instance, by computing checksums for segments, or portions of segments, as appropriate.

Process 600 sets the memory controller to operate in a checkpoint mode (step 606). Process 600 may end thereafter or exit at exit point marked "A" to enter another process having a corresponding entry point marked "A". Checkpoint mode is a mode of operation where the memory controller is enabled to perform operations relating to checkpointing of memory segments, as in the description of FIG. 5.

Figure 7:
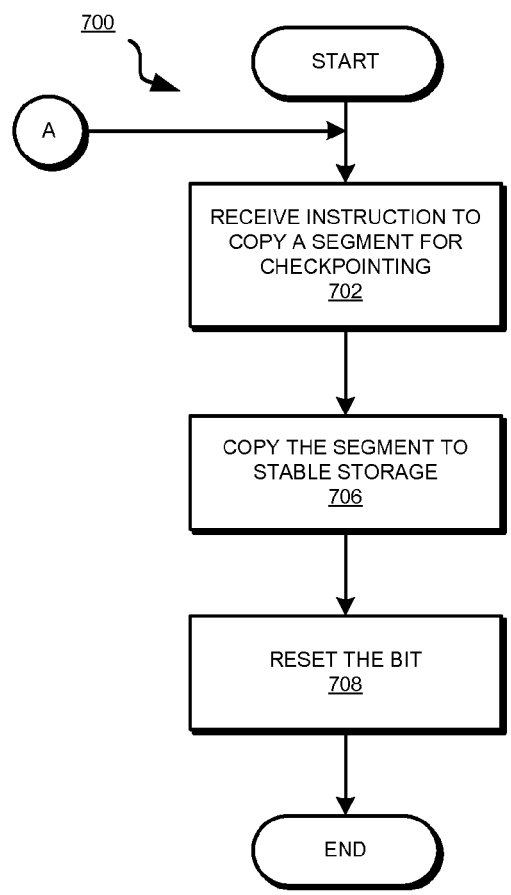
FIG. 7 depicts a flowchart of an example process of checkpointing for recovery in a shared memory environment in accordance with an illustrative embodiment.

With reference to FIG. 7, this figure depicts a flowchart of an example process of checkpointing for recovery in a shared memory environment in accordance with an illustrative embodiment. Process 700 may be implemented to execute using memory controller 506 in FIG. 5 as modified according to an embodiment.

Process 700 begins by receiving an instruction to copy a segment for checkpointing (step 702). Another process, such as process 600 in FIG. 6, may enter process 700 at entry point marked "A".

Process 700 copies the data from the segment to a stable storage (step 706). Process 700 resets the bit corresponding to the segment upon successful copy in step 706 (step 708). Process 700 is repeated for every memory segment that has to be written in the checkpoint. Note that this process proceeds in parallel with the execution the application 518 on ULC 512. Process 700 ends thereafter.

Figure 8:
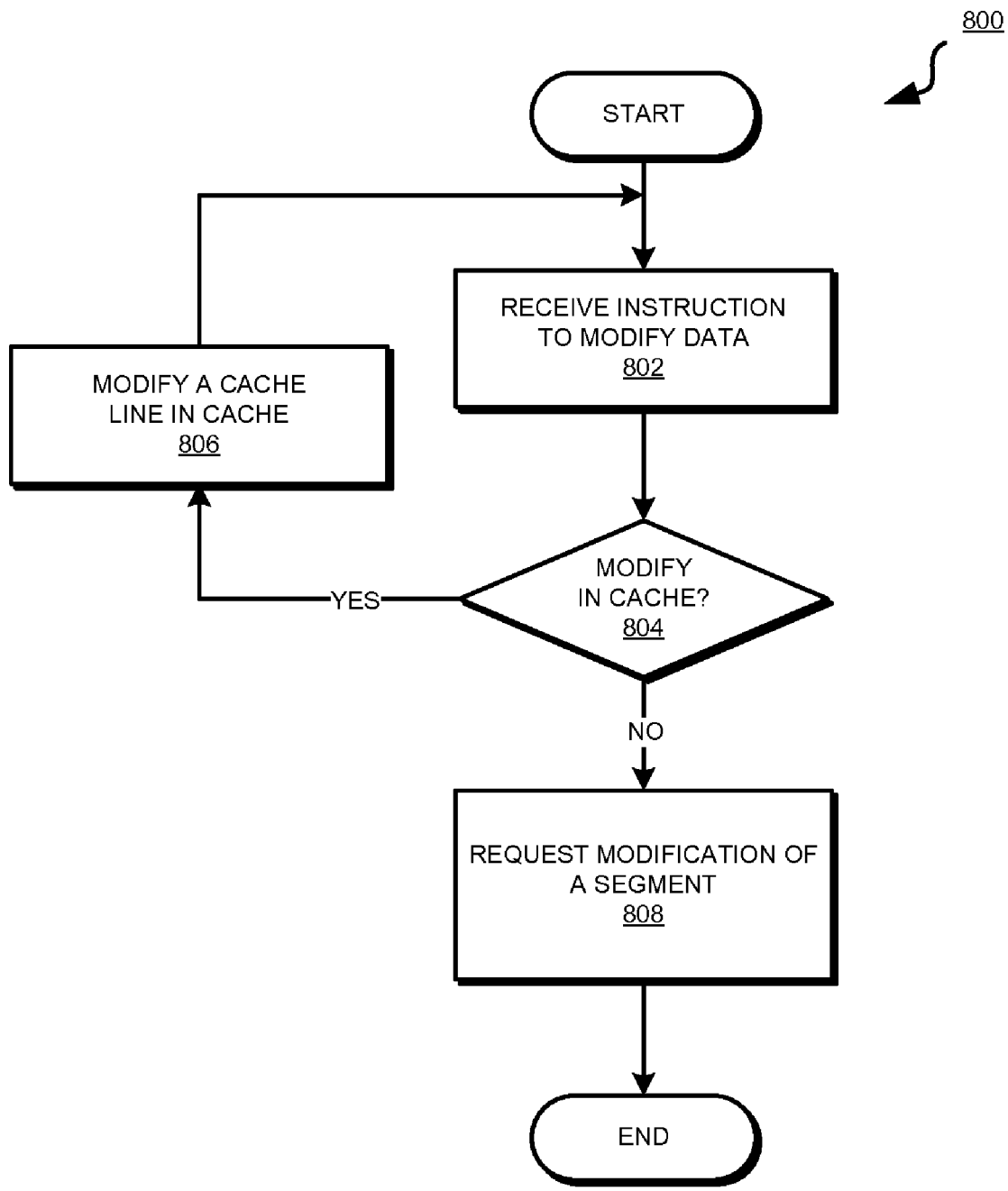
FIG. 8 depicts a flowchart of an example process of modifying a segment of a shared memory in accordance with an illustrative embodiment.

With reference to FIG. 8, this figure depicts a flowchart of an example process of modifying a segment of a shared memory in accordance with an illustrative embodiment. Process 800 may be implemented to execute using memory controller 520 and ULC 510 in FIG. 5.

Process 800 begins by receiving an instruction to modify data (step 802). Process 800 determines whether the modification can occur in a cache, such as a cache associated with the ULC (step 804). If the modification can occur using the cache ("Yes" path of step 804), process 800 modifies a cache line in the cache (step 806). Process 800 returns to step 802.

If the modification cannot occur using the cache ("No" path of step 804), process 800 sends a request to modify a segment of shared memory using the modified data of step 802 (step 808). Process 800 ends thereafter.

Figure 9:
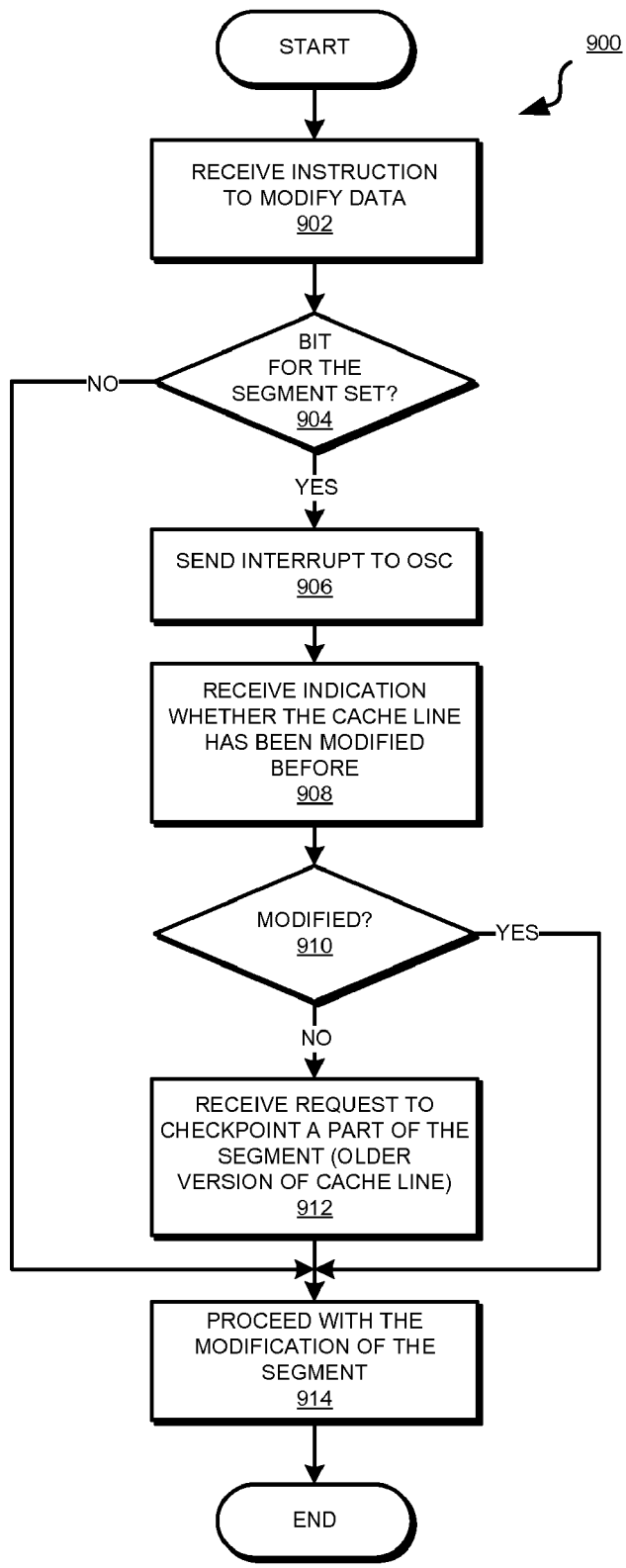
FIG. 9 depicts a flowchart of another example process of modifying a segment of a shared memory in accordance with an illustrative embodiment.

With reference to FIG. 9, this figure depicts a flowchart of another example process of modifying a segment of a shared memory in accordance with an illustrative embodiment. Process 900 may be implemented to execute using memory controller 506 and OSC 514 in FIG. 5.

Process 900 begins by receiving an instruction to modify a cache line (for instance, because of cache eviction) (step 902). Process 900 determines whether the bit for a segment desired to be modified is set (step 904).

If the bit is not set ("No" path of step 904), process 900 determines that the segment has already been checkpointed and proceeds to modify the segment according to step 914. If the bit is set ("Yes" path of step 904), process 900 sends an interrupt to an OSC (step 906). Process 900 receives an indication whether the cache line to be modified has already been modified (step 908). For example, the OSC can check cache line tracking 522 in FIG. 5 and send the indication.

Based on the indication, process 900 determines whether the cache line has been modified before (step 910). If the cache line has been modified before ("Yes" path of step 910), the new modification can take place by moving directly to step 914. If the segment has not been modified with that data ("No" path of step 910), process 900 receives a request to checkpoint the cache line (step 912).

Upon completing the checkpointing, process 900 proceeds to modify the cache line with the data of step 902 (step 916). Process 900 ends thereafter.

Figure 10:
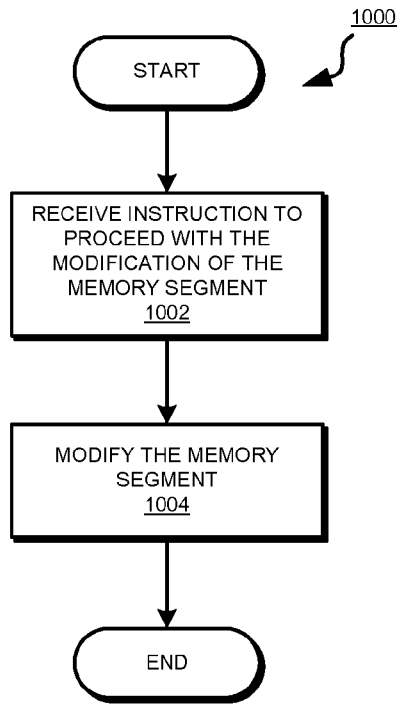
FIG. 10 depicts a flowchart of another example process of modifying a segment of a shared memory in accordance with an illustrative embodiment.

With reference to FIG. 10, this figure depicts a flowchart of another example process of modifying a segment of a shared memory in accordance with an illustrative embodiment. Process 1000 may be implemented to execute using memory controller 520 in FIG. 5 as modified by an embodiment.

Process 1000 begins by receiving an instruction to proceed with the modification of a memory segment, for example, due to a cache eviction (step 1002).

Process 1000 modifies the memory segment, such as by sending an instruction to a memory controller (step 1004). Process 1000 ends thereafter.

Figure 11:
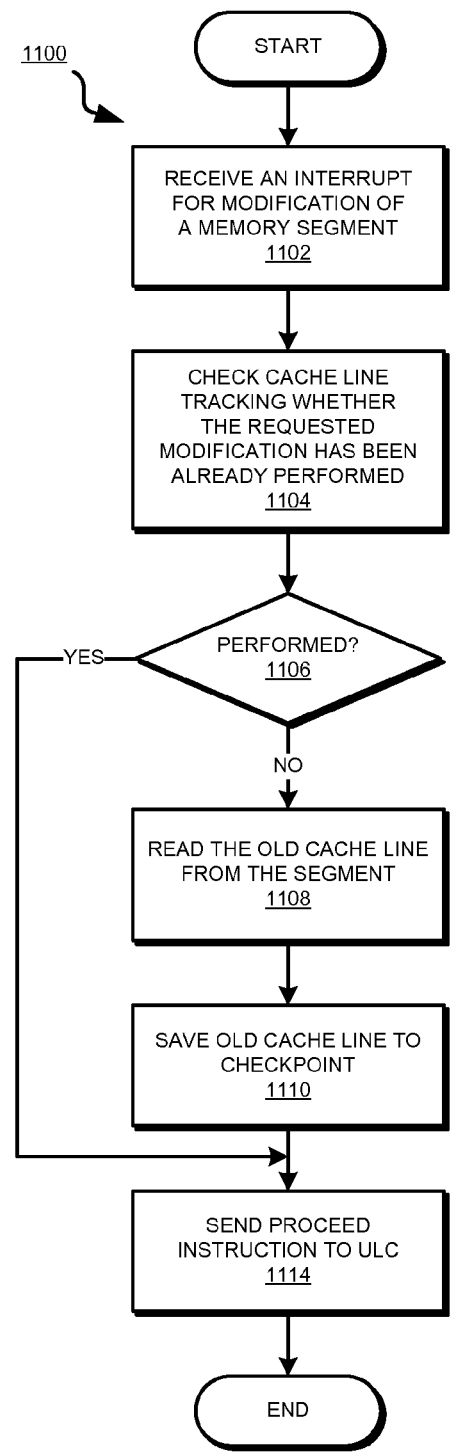
FIG. 11 depicts a flowchart of an example process of managing checkpointing and recovery in a shared memory environment in accordance with an illustrative embodiment.

With reference to FIG. 11, this figure depicts a flowchart of an example process of managing checkpointing and recovery in a shared memory environment in accordance with an illustrative embodiment. Process 1100 may be implemented to execute using OSC 514 in FIG. 5.

Process 1100 begins by receiving an interrupt for modification of a memory segment (step 1102). For example, another process, such as process 900 in FIG. 9 may have checked the bitmap in memory controller, allowing the modification to proceed if the corresponding segment's bit is not set and sending the interrupt to OSC as in step 1102. Process 1100 checks a cache line tracking, such as cache line tracking 522 in FIG. 5, to determine whether the requested modification has been already performed (step 1104).

Process 1100 determines a performed status according to the checking of step 1104 (step 1106). If the modification has not been performed ("No" path of step 1106), process 1100 causes a read of the old copy of the cache line from the memory segment (step 1108). Process 1100 further causes a save of the old copy to the checkpoint (step 1110).

Note that an application wishing to make the modification using a ULC has not stopped during this step, which occurs in parallel. Also, the memory controller is blocked only during the copying of a single cache line, which is much smaller than a page or other unit of checkpointing in prior art.

Process 1100 sends an instruction to proceed with the modification (step 1114). Process 1100 ends thereafter. Returning to step 1106, if process 1100 determines that the requested modification has already been performed ("Yes" path of step 1106), process 1100 proceeds to step 1114 and ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method is provided in the illustrative embodiments for recovery in a shared memory environment. Using an embodiment of the invention, a shared memory data processing environment may be able to checkpoint portions of a shared memory asynchronously with applications' demand to modify memory segments.

An interrupt described in an embodiment can be any messaging suitable between an ULC and an OSC within the scope of the invention. A bit in a bitmap according to an embodiment may be replaced with a flag having any suitable data structure. The bitmap may be replaced by a set of flags, the set of flags having any suitable data structure within the scope of the invention. The bitmap or its equivalent may be located anywhere such that a memory controller according to an embodiment may have access to the bitmap.

Any number of caches and any number of levels of cache may be associated with a ULC or an OSC. Any number of cores may be designated as ULC or OSC. Furthermore, cores on different processors may be designated as ULCs or OSCs that collaborate to manage the checkpointing and recovery of shared memory in accordance with an embodiment.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for recovery in a shared memory data processing environment, the computer implemented method comprising:

designating, using a data processing device and a data storage device, a first core in a multi-core processor configuration as a user level core (ULC), wherein the ULC executes an instruction to modify a memory during the course of executing an instruction of an application;

designating a second core in the multi-core processor configuration as a operating system core (OSC), wherein the OSC manages checkpointing of a plurality of segments of the shared memory;

maintaining a set of flags, the set of flags being accessible to a memory controller, the memory controller managing access to a shared memory in the shared memory data processing environment, a flag in the set of flags corresponding to one segment in the plurality of segments of the shared memory;

receiving a message for modification of a cache line in a segment in the plurality of segments;

determining, forming a cache line tracking, whether a cache line to be used for the modification has already been used for a similar modification of the segment as requested by the message;

sending, responsive to the cache line tracking being negative, an instruction to checkpoint an older version of the cache line in the segment;

detecting a successful completion of checkpointing of the older version of the cache line in the segment; and sending an instruction to proceed with the modification requested in the message.

2. The computer implemented method of claim 1, wherein a flag in the set of flags represents a checkpointing status of a corresponding segment of the shared memory, further comprising:

flushing a cache to the shared memory;

taking an initial checkpoint of a portion of the shared memory; and setting the set of flags.

3. The computer implemented method of claim 1, further comprising:

receiving an instruction to modify data;

determining whether the modification according to the instruction can occur in a cache;

sending the message for the modification of the cache line in the segment when the modification according to the instruction cannot occur in the cache.

4. The computer implemented method of claim 3, further comprising:

avoiding sending the message for the modification of the segment when the modification according to the instruction can occur in the cache; and performing the modification according to the instruction in the cache.

5. The computer implemented method of claim 3, further comprising:

checking a flag corresponding to the segment when the modification according to the instruction cannot occur in the cache; and responsive to the flag being reset, modifying the segment without sending the message for the modification of the segment.

6. The computer implemented method of claim 3, wherein the instruction to modify data is received at the ULC, and wherein the determining whether the modification according to the instruction can occur in the cache is performed using a cache associated with the ULC.

7. The computer implemented method of claim 3, further comprising:

checking a flag corresponding to the segment when the modification according to the instruction cannot occur in the cache; and responsive to the flag being set, sending an interrupt from the memory controller to the OSC causing the cache line tracking;

responsive to cache line tracking indicating that the cache line has been written before, sending a message to memory controller to proceed with the modification;

responsive to cache line tracking indicating that the cache line has not been written before, checkpointing the older version of the cache line; and modifying the segment with the cache line responsive to completing the checkpointing the older version of the cache line.

8. The computer implemented method of claim 1, wherein the checkpointing of the segment occurs asynchronously with respect to execution of instructions on the ULC.

9. The computer implemented method of claim 1, wherein the message is an instruction.

10. The computer implemented method of claim 1, wherein the message is sent from the ULC to the memory controller, wherein the instruction to checkpoint the segment is sent from the OSC to the memory controller, and the instruction to proceed is sent from the OSC to the memory controller.

11. The computer implemented method of claim 1, wherein the set of flags is a bitmap, and a flag in the set of flags is a bit in the bitmap.

* * * * *